(12) United States Patent
Kang et al.

(10) Patent No.: US 8,396,189 B2
(45) Date of Patent: *Mar. 12, 2013

(54) PHOTONEUTRON CONVERSION TARGET AND PHOTONEUTRON—X RAY SOURCE

(75) Inventors: Kejun Kang, Beijing (CN); Haifeng Hu, Beijing (CN); Yigang Yang, Beijing (CN); Zhiqiang Chen, Beijing (CN); Qitian Miao, Beijing (CN); Jianping Cheng, Beijing (CN); Yuanjing Li, Beijing (CN); Yinong Liu, Beijing (CN); Hua Peng, Beijing (CN); Tiezhu Li, Beijing (CN); Ziran Zhao, Beijing (CN); Yaohong Liu, Beijing (CN); Wanlong Wu, Beijing (CN)

(73) Assignees: Tsinghua University, Beijing (CN); Nuctech Company Limited, Beijing (CN)

(*) Notice: Subject to any disclaimer, the term of this patent is extended or adjusted under 35 U.S.C. 154(b) by 456 days.

This patent is subject to a terminal disclaimer.

(21) Appl. No.: 12/665,296

(22) PCT Filed: Jun. 19, 2008

(86) PCT No.: PCT/CN2008/001199
§ 371 (c)(1),
(2), (4) Date: Jun. 11, 2010

(87) PCT Pub. No.: WO2009/000156
PCT Pub. Date: Dec. 31, 2008

(65) Prior Publication Data
US 2010/0266103 A1    Oct. 21, 2010

(30) Foreign Application Priority Data
Jun. 21, 2007 (CN) .......................... 2007 1 0117692

(51) Int. Cl.
*G01N 23/04* (2006.01)

(52) U.S. Cl. .... 378/63; 378/57; 250/390.01; 250/494.1; 250/503.1

(58) Field of Classification Search ............ 378/57, 378/63, 106; 250/390.01, 390.02, 390.04, 250/390.06, 393, 394, 492.1, 492.2, 493.1, 250/494.1, 503.1
See application file for complete search history.

(56) References Cited

U.S. PATENT DOCUMENTS
4,327,293 A * 4/1982 Taumann ..................... 378/147
4,980,901 A    12/1990 Miller
(Continued)

FOREIGN PATENT DOCUMENTS
CN    2890900    4/2007
CN    1959387    5/2007
(Continued)

OTHER PUBLICATIONS
International Search Report dated Sep. 18, 2008 issued in corresponding PCT Application No. PCT/CN08/01199.

*Primary Examiner* — Thomas R Artman
(74) *Attorney, Agent, or Firm* — Kenyon & Kenyon LLP

(57) ABSTRACT

A photoneutron-x ray source includes a photoneutron conversion target, which outputs both photoneutrons and x-rays simultaneously. The photoneutron-x ray source includes an x-ray generator for generating an x-ray main beam that is applied to the photoneutron conversion target. The photoneutron conversion target generates photoneutrons upon the application of the x-ray main beam to the photoneutron conversion target. The photoneutron conversion target has a body that defines a passageway extending through the body and that is structured such that a first x-ray beam of the x-ray main beam can pass through the passageway without any reaction with the body, while a second x-ray beam of the x-ray main beam can enter the body and react with the body to emit the photoneutrons.

23 Claims, 3 Drawing Sheets

U.S. PATENT DOCUMENTS

| | | | |
|---|---|---|---|
| 5,078,952 A | 1/1992 | Gozani et al. | |
| 5,124,554 A * | 6/1992 | Fowler et al. | 250/358.1 |
| 5,838,759 A * | 11/1998 | Armistead | 378/57 |
| 5,896,429 A * | 4/1999 | Lanza et al. | 376/159 |
| 7,399,976 B2 * | 7/2008 | Kang et al. | 250/390.04 |
| 7,622,726 B2 * | 11/2009 | Zillmer et al. | 250/496.1 |
| 2007/0096036 A1 * | 5/2007 | Kang et al. | 250/390.04 |
| 2008/0156997 A1 * | 7/2008 | Kearfott | 250/390.04 |
| 2008/0247504 A1 * | 10/2008 | Edic et al. | 378/9 |
| 2010/0246763 A1 * | 9/2010 | Kang et al. | 378/57 |
| 2010/0266103 A1 * | 10/2010 | Kang et al. | 378/143 |

FOREIGN PATENT DOCUMENTS

| | | |
|---|---|---|
| WO | WO 98/55851 | 12/1998 |
| WO | WO 2006/037169 | 4/2006 |

\* cited by examiner

PHOTONEUTRON CONVERSION TARGET AND PHOTONEUTRON—X RAY SOURCE

FIELD OF THE INVENTION

The present invention relates to a photoneutron conversion target, particularly, for example, used in contraband detection systems, for generating photoneutrons with X-rays.

BACKGROUND INFORMATION

At the present time, terrorism constitutes a great threat to international and domestic social stability. Governments of countries are endeavoring in anti-terrorism. Detection technology of contraband such as explosives is the core of anti-terrorism.

An existing contraband detection technology is x-ray imaging detection technology. X-ray imaging detection technology is a broadly applied safety inspection technology. Many devices based on the x-ray imaging detection technology can be seen in airports and at railway stations. Since x-ray mainly reacts with the orbital electrons outside the atomic nucleus, it has no capability in distinguishing the characteristics of the atomic nucleus. Therefore, only the density (mass thickness) of the detected object can be measured using x-ray, and it is impossible to determine the kinds of elements of the detected object. In practice, when contraband is mixed with daily articles and the density thereof is hard to be distinguished from that of the daily articles, it is difficult to find the contraband by the x-ray imaging detection technology. Although some new x-ray imaging detection technologies, for example, dual-energy x-ray and CT technology, have been somewhat improved in recognition or discrimination capability, they still cannot overcome the inherent disadvantage of inability to recognize the kinds of elements.

Another existing illicit-article detection technology is neutron type detection technology. As to the neutron type detection technology, neutrons can react with the atomic nucleus of a substance and emit characteristic γ-rays. It is possible to determine the kinds of the elements of the analyzed substance based on the energy spectrum of γ-rays. A disadvantage of the neutron type detection technology is modest imaging resolution which, at best, reaches a spatial resolution of 5 cm×5 cm×5 cm at the present time, far lower than the millimeter-grade resolution of x-ray imaging. Additionally, a separate neutron source is usually expensive and limited in life-time, and neutron yield is not high enough.

Therefore, a method and/or system is desirable which is capable of combining the above-mentioned x-ray imaging detection technology and neutron type detection technology so as to obtain the advantages of high resolution of the x-ray imaging detection technology and the element recognition capability of the neutron type detection technology. U.S. Pat. No. 5,078,952 refers to an explosive detection system which combines a plurality of detecting means including an x-ray imaging means and a neutron detecting means to realize high detection probability and lower false positive. U.S. Pat. No. 5,078,952 further discloses associating the data obtained by the x-ray imaging means with the data obtained by the neutron detecting means so as to make up, with a high resolution x-ray image, for the of the low resolution of the neutron type detection technology. However, an x-ray source and a neutron source, which are independent of one another, are used in U.S. Pat. No. 5,078,952, and so the cost thereof is more expensive.

A neutron generating technology can be used to bombard a conversion target with x-rays to generate neutrons from the conversion target. The neutrons generated in this way can be called photoneutrons. This photoneutron generating technology provides a possibility of generating both x-rays and neutrons from single source, which would reduce cost as compared to generating x-rays and neutrons using two sources respectively.

International Patent Application Publication WO 98/55851 refers to a system of detecting and recognizing contraband by photoneutron imaging and x-ray imaging. The system works in two steps. Specifically, the system first generates an x-ray beam using a linear accelerator x-ray source and detects an object by x-ray imaging. If no abnormality is found, the detected object is allowed to pass; if a suspect region is found, a photoneutron conversion target (beryllium) is temporarily inserted into the x-ray beam so as to generate photoneutrons, and the suspect region is detected based on characteristic γ-rays emitted from the radiative capture reaction between the photoneutrons and the atomic nucleus of the substance. The system performs the first step of detection using only x-rays. Due to the limit of the recognition capability of the x-ray imaging detection technology as stated above, the system has a low probability of detection (PD). Besides, the system does not simultaneously generate x-rays and photoneutrons for detection, but generates x-rays and photoneutrons for detection in two separate steps. That is, only x-rays and no photoneutrons are generated in one step, while photoneutrons are generated using the x-rays in another step. However, the x-rays generated in said another step are only used for generation of photoneutrons not for detection purpose. Further, the generated photoneutrons are only used for detection of the suspect region of the detected object; not for overall detection of the detected object.

Chinese Patent Application No. 200510086764.8 discloses a method of recognizing materials using fast neutrons and x-rays. The application describes a method and device of simultaneously generating x-rays and photoneutrons, which splits the x-rays generated by an accelerator into two beams one of which is used in generating photoneutrons. In the application, however, as far as the neutrons are concerned, detection is performed by way of the intensity of photoneutrons that pass through the object to be detected; not by way of the characteristic γ-rays emitted from the reaction between the neutrons and the detected object. Additionally, such a detection usually requires for the x-ray beam to be laterally spaced apart from the neuron beam by a distance in order that the x-ray beam and the neutron beam do not interfere with one another in their detections.

The contents of each of the above-referenced applications and patents are hereby incorporated by reference in their entireties.

SUMMARY OF THE INVENTION

An object of the present invention is to provide a photoneutron conversion target and a photoneutron-x ray source having the photoneutron conversion target, which can generate both photoneutrons and x-rays simultaneously.

In an example embodiment of the present invention, a photoneutron conversion target for generating photoneutrons by bombarding the photoneutron conversion target with an x-ray main beam has a body and a passageway defined by and extending through the bodym through which passageway a first x-ray beam of the x-ray main beam can pass without any reaction with the body, while a second x-ray beam of the x-ray main beam can enter the body and react with the body to emit photoneutrons.

In an example embodiment of the present invention, a photoneutron-x ray source for simultaneously generating photoneutrons and x-rays includes: an x-ray generator for generating an x-ray main beam, a photoneutron conversion target for generating photoneutrons by bombarding the photoneutron conversion target with the x-ray main beam, the photoneutron conversion target having a body and a passageway defined by and extending through the body. A first x-ray beam of the x-ray main beam can pass through the passageway without any reaction with the body, while a second x-ray beam of the x-ray main beam can enter the body and react with the body to emit photoneutrons.

The photoneutron conversion target and the photoneutron-x ray source having the photoneutron conversion target can generate both photoneutrons and x-rays simultaneously. Further, the photoneutron conversion target and the photoneutron-x ray source may be applied to instances and for applications, where both photoneutrons and x-rays are required simultaneously, besides for the example instances and applications referenced with respect to the exemplary embodiments described below.

DETAILED DESCRIPTION

Figure 1:
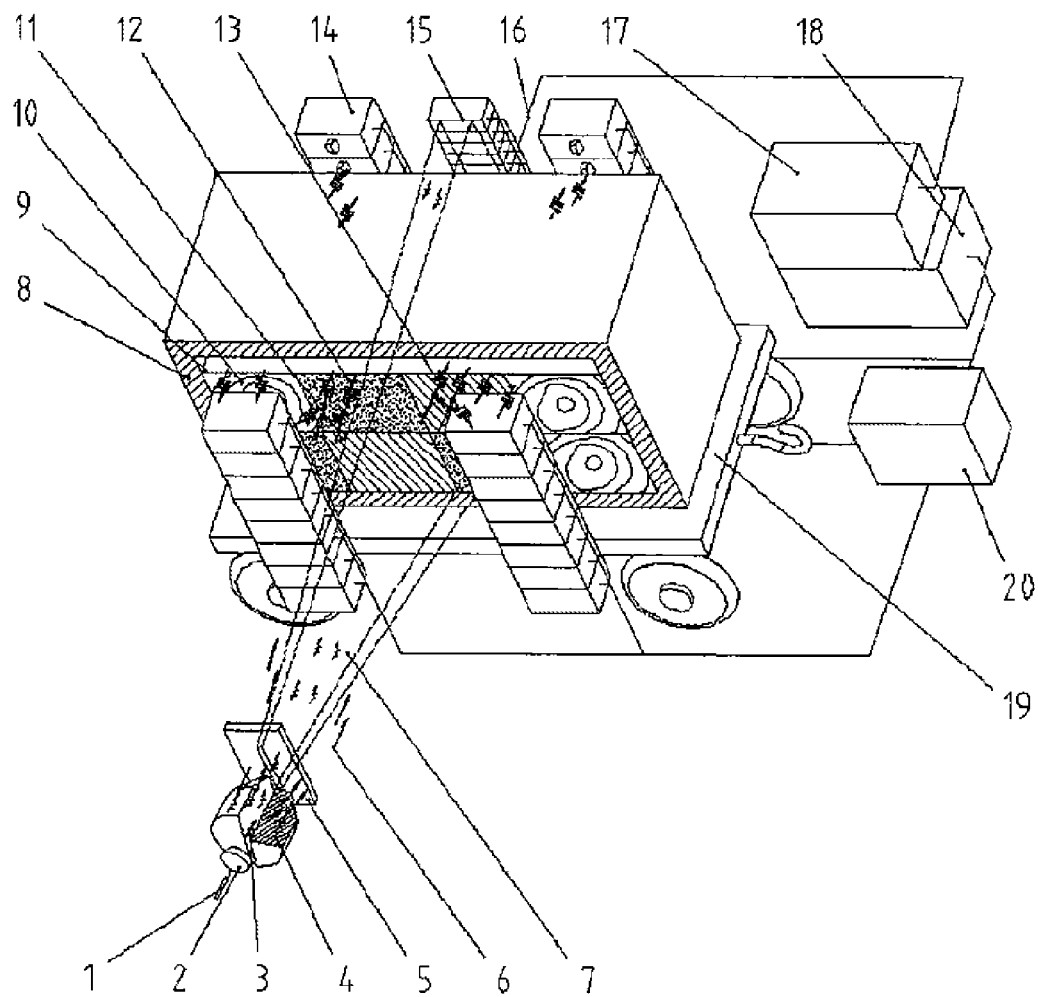
FIG. 1 shows a structural schematic drawing of a system for contraband detection using photoneutrons and x-rays according to an example embodiment of the present invention.

Referring to an example embodiment shown in FIG. 1, an object to be detected (for example a closed container 8) is disposed on a platform 19. The container 8 in FIG. 1 is shown in a sectional view so as to show various goods 10 loaded therein. The goods may include various materials, for example a metal 11, a wood block 12 and an explosive 13. The platform 19 is drawn by a traction device 20 into a detection area in a detection system of the present invention. The container 8 may be made, for example, from corrugated steel and aluminum. Similar detection can also be performed on other containers such as aviation containers.

In an example embodiment, when a position sensor (not shown) detects that the container 8 has moved to a predetermined position, the position sensor activates an x-ray generator in the system of the present invention to start working.

In an example embodiment, the x-ray generator includes an electron accelerator (not shown) and an electron target 2. The electron accelerator generates an electron beam 1 directed to the electron target 2. The electron target 2 may be advantageously composed of a substance having a high atomic number, for example tungsten and gold. After being blocked by the atoms of tungsten or gold, the electrons will emit an x-ray main beam 3 due to bremsstrahlung. As described in detail below, a first x-ray beam and a second x-ray beam are divided out from the x-ray main beam 3. The first x-ray beam is used for x-ray imaging detection, and the second x-ray beam is used for neutron detection. The x-ray imaging detection herein refers to transmission of x-rays through the detected object and detection of density information of the detected object by detecting attenuation of the x-rays. The neutron detection herein refers to reaction by the neutrons with the atoms of the detected object to emit characteristic γ-rays and detection of information of element kind of the detected object by detecting the characteristic γ-rays. According to an example embodiment of the present invention, the object is detected using the x-ray imaging detection and neutron detection simultaneously.

In FIG. 1, an example photoneutron conversion target 4 is shown by a partial sectional view. The x-ray beam 3 bombards the photoneutron conversion target 4 to obtain photoneutrons 6, which may be used for performing a photoneutron interrogation of the container 8. Particularly, in an example embodiment of the present invention, the photoneutron conversion target 4 splits a first x-ray beam and a second x-ray beam out from the x-ray main beam 3.

Figure 2:
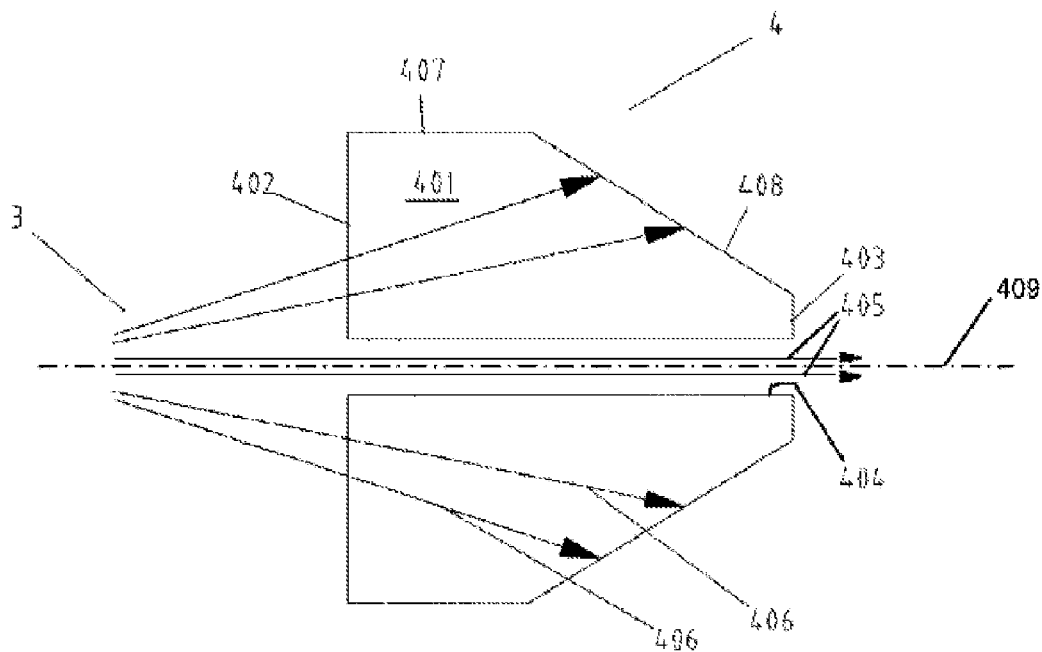
FIG. 2 shows an enlarged plane schematic drawing of a photoneutron conversion target shown in FIG. 1, and shows a passageway defined by the photoneutron conversion target, according to an example embodiment of the present invention.
Figure 3:
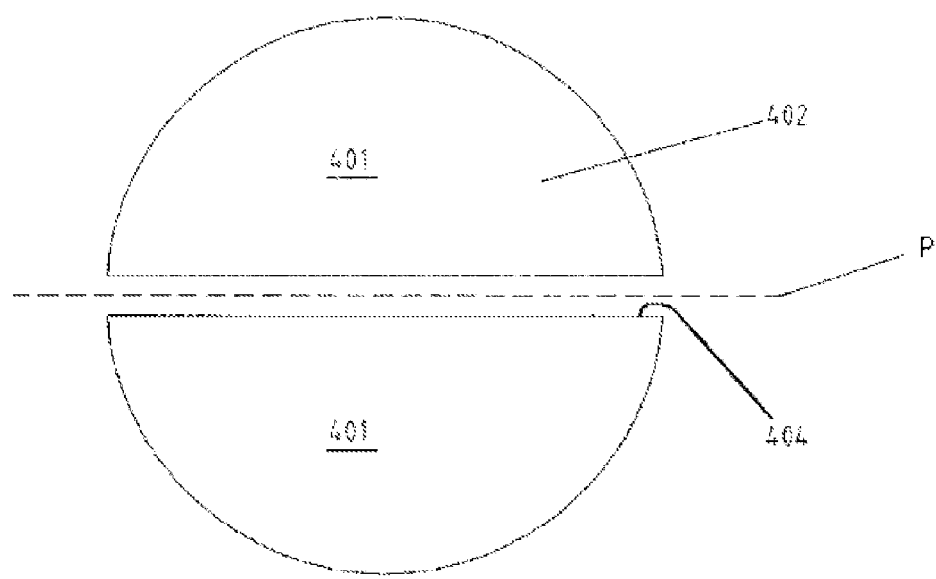
FIG. 3 shows an end view of the photoneutron conversion target of FIG. 2, according to an example embodiment of the present invention.

The photoneutron conversion target 4 in FIG. 1 is shown in enlarged form in FIGS. 2 and 3. As shown in FIG. 2, the photoneutron conversion target 4 comprises a body 401. In one embodiment, the body 401 is an elongated body extending in a propagation direction of the x-ray main beam 3 and has a first end 402 and a second end 403, with a passageway 404 extending therethrough from the first end 402 to the second end 403. In the example embodiments shown in FIGS. 2 and 3, the passageway 404 is formed as a gap fully extending within a plane P (perpendicular to the papers of FIGS. 2 and 3) so that the body 401 is split into two separate parts. Preferably, the passageway 404 extends through the center of symmetry of the body 401 and splits it into two symmetric parts. The passageway 404 is defined between these two separate parts. When the x-ray main beam 3 approaches the body 401 of the photoneutron conversion target 4, a part 405 of the x-ray main beam directly passes through the photoneutron conversion target 4 via the passageway 404 without any reaction with the photoneutron conversion target 4. This part of x-ray beam is defined as the first x-ray beam 405. Another part 406 of the x-ray main beam enters the body 401 and propagates in a direction from the first end 402 to the second end 403 (and/or an end of a tapered portion 408 described below with respect to an example embodiment) and reacts with the atomic nucleus of the photoneutron conversion target 4 during propagation to emit photoneutrons. This part of x-ray beam 406 is defined as the second x-ray beam 406. It can be seen that the passageway 404 actually serves as a beam splitter for splitting a first x-ray beam and a second x-ray beam out from the x-ray main beam 3. In other example embodiments, which are not shown, the passageway 404 can also adopt other forms. For example, the passageway can be formed as a through hole (not shown) extending through the body 401 without splitting the body 401 into two parts, or can have another passageway form defined by the body 401, as long as it can ensure that the x-ray fan beam used for x-ray imaging can pass through the body 401.

In order to make full use of the x-ray main beam 3 emerging from the electron target 2 so as to increase the yield of photoneutrons from the photoneutron conversion target 4, the photoneutron conversion target 4 can be shaped to substantially match with the intensity distribution of the x-ray main beam 3, e.g., to enable x-rays having greater intensity to propagate a greater distance within the body 401 of the photoneutron conversion target 4. Referring to FIGS. 1 and 2, the x-ray main beam 3 emerging from the electron target 2 usually has an axially symmetrical intensity distribution about an intensity distribution symmetry axis extending in the direction of the electron beam 1. Usually, the closer to the intensity distribution symmetry axis, the greater the intensity of the x-rays will be. Correspondingly, under the condition of ignoring the passageway 404 within the photoneutron conversion target 4, the photoneutron conversion target 4 as a whole has an axially symmetrical shape and defines a target symmetry axis 409. In an example embodiment, the axially symmetrical shape of the photoneutron conversion target 4 substantially matches with the axially symmetrical distribution of the x-ray main beam 3. In use, the target symmetry axis 409 coincides with the intensity distribution symmetry axis of the x-ray main beam 3. Preferably, at least a portion of the photoneutron conversion target 4 is preferably tapered toward the second end 403 so that the photoneutron conversion target 4 has a greater longitudinal length where it is closer to the target symmetry axis. In the example embodiment as shown in FIG. 2, the photoneutron conversion target 4 includes the tapered portion 408 adjacent to the second end 403 and a cylindrical portion 407 adjacent to the first end 402. The cylindrical portion 407 can be integrally formed with the tapered portion 408. The tapered portion 408 can terminate at the second end 403. The tapered portion 408 as shown in FIG. 2 is a truncated cone. The cylindrical portion 407 and the tapered portion 408 have a common longitudinal central axis coinciding with the target symmetry axis. In other embodiments, the tapered portion 408 can be a non-truncated cone, or can be tapered in another manner (for example, tapered in a curve). In other embodiments, the photoneutron conversion target 4 can also be tapered from the first end 402 to the second end 403.

Although FIGS. 1-3 show that the passageway 404 defined by the photoneutron conversion target 4 serves as a beam splitter, other forms of beam splitters, such as a dual-passageway split collimator disclosed in Chinese Patent Application No. 200510086764.8, can also or instead be adopted for splitting a first x-ray beam and a second x-ray beam out from the x-ray main beam 3. The dual-passageway split collimator can split the x-ray main beam 3 into two beams spaced from each other, with the photoneutron conversion target disposed on the propagation path of one of the two beams so as to generate photoneutrons.

Tapering of the photoneutron conversion target 4 is not limited to application to the circumstances as stated with respect to the described example embodiments of this invention. The feature may also be applied to any other circumstance in which an x-ray beam is used to bombard the photoneutron conversion target to generate photoneutrons. For example, it can be applied to the circumstances of International Patent Application Publication No. WO 98/55851 and Chinese Patent Application No. 200510086764.8 so as to increase the yield of photoneutrons. In these other circumstances, the photoneutron conversion target can have or have not an above-mentioned passageway serving as a beam splitter.

Returning to FIG. 1, according to an example embodiment of the present invention, the energy selected for the electron beam 1 depends on the energy of the desired x-ray beam and on the material of the photoneutron conversion target.

As for the energy of the desired x-ray beam selected for penetration, this may vary depending on the kinds of objects to be detected, the different detection speeds, and different environment safeties. For sake of safety and saving cost, energy is usually selected to be as low as possible. The electron accelerator can generate energy within a range of between 1 MeV and 15 MeV.

Desirable material of the photoneutron conversion target 4 should have a small photoneutron threshold of reaction and great photoneutron reaction cross section, both of which are hard to satisfy simultaneously, however. As far as an x-ray of between 1 MeV and 15 MeV is concerned, since the energy thereof is not high enough, the yield of photoneutrons is low for the target material having a great cross section and a great threshold. However, beryllium ($^9$Be) or heavy water ($D_2O$) is a more desirable material. The photoneutron threshold of reaction of $^9$Be is only 1.67 MeV, and the threshold of reaction of D in $D_2O$ is 2.223 MeV. The x-ray main beam 3 entering the photoneutron conversion target 4 performs photoneutron reaction with the $^9$Be or $^2$H therein to emit photoneutrons 6. Since the energy spectrum of the x-ray main beam 3 is continuously distributed, the energy spectrum of the photoneutrons 6 is also continuously distributed. In addition, when the electron accelerator used can generate an electron beam 1 having higher energy, the photoneutron conversion target 4 can also be made of a material having a greater threshold but a greater cross section, for example various isotopes of tungsten (W) and various isotopes of uranium (U).

In one embodiment, the electron accelerator can generate an electron beam 1 at a specific frequency. In this way, the electron beam 1 is electron beam pulses having the specific frequency. After the electron beam pulses bombard the electron target 2, x-ray pulses 3 are generated at the same frequency. The specific frequency can be determined based on the traveling speed of the container 8 to be detected, for example within the range of between 10 Hz and 1000 Hz. In one embodiment, the specific frequency can be 250 Hz. The electron beam pulses can have a pulse width between 1 and 10 μs.

It takes a very short time (usually shorter than 1 μs) for generating photoneutrons 6 when the x-ray main beam 3 bombards the photoneutron conversion target 4. Therefore, it is observed that the photoneutrons 6 used for neutron detection and the first x-ray beam 405 in the x-ray main beam 3 used for x-ray imaging detection are almost "simultaneously" generated. This allows for performance of x-ray imaging detection and neutron detection simultaneously. This is obviously different from that which is described in International Patent Application Publication No. WO 98/55851.

The photoneutrons 6 are isotropic when generated within the photoneutron conversion target 4. Therefore, only a part of photoneutrons can be directed toward the container 8 to be detected. Since $^9$Be and $^2$H in the photoneutron conversion target 4 have a great scattering cross section for neutrons, the photoneutrons 6 emerging from the photoneutron target 4 will generally emit backward (namely opposite to the direction of the x-ray main beam 3 that enters the photoneutron conversion target 4). In order to increase the efficiency at which the photoneutrons 6 reach the container 8 to be detected, a neutron reflector (not shown) can be provided behind the photoneutron target 4 (adjacent the first end 402 of the photoneutron target 4). The neutron reflector is used to reflect the photoneutrons 6 that move away from the container 8 so as to cause them to move toward the container 8.

Referring to FIGS. 1 and 2, an x-ray collimator 5 is disposed in the propagation path of the first x-ray beam 405 before it reaches the detected object 8 so as to collimate the first x-ray beam into a planar fan beam. The x-ray collimator 5 is preferably arranged adjacent the second end 403 of the body 402 of the photoneutron conversion target 4 and aligned with the passageway 404. In this way, the first x-ray beam 405 is collimated by the x-ray collimator 5 after passing through the photoneutron conversion target 4 via the passageway 404, thereby forming a planar fan beam 7. X-rays outside the fan beam 7 will be shielded off by the x-ray collimator 5. In this way, an effect of x-rays on neutron detection (especially with respect to the γ-ray detector described below) will be reduced.

X-ray imaging detection of the container 8 using the first x-ray beam 405 and neutron detection of the container 8 using the photoneutrons 6 generated from second ray beam 406 will hereinafter be respectively described. X-ray imaging detection and neutron detection per se are well known to those of ordinary skill in the art. According to example embodiments of the present invention, however, the x-ray imaging detection and the neutron detection can be performed simultaneously since the first x-ray beam 405 and the photoneutrons 6 can be generated simultaneously (or almost simultaneously).

With respect to X-ray imaging detection, referring to FIG. 1, in an example embodiment, the x-ray fan beam 7 (namely the collimated first x-ray beam 405) is emitted toward the container 8 to be detected. The goods loaded within the container 8 will attenuate the fan beam 7. An X-ray detecting arrangement will measure the attenuated x-rays. The x-ray detecting arrangement can be an x-ray detector array 15 including a plurality of x-ray detectors. The attenuation factor of the x-rays reflects the absorption capability of the material to the x-rays along a line from the electron target 2 to the corresponding x-ray detector in the x-ray detector array 15. The magnitude thereof is associated with the density and composition of the substance loaded within the container 8. It is possible to realize two-dimensional x-ray imaging of the container 8 using the x-ray detector array 15. The detectors in the x-ray detector array 15 can be gas ionization chambers, cadmium tungstate crystals, and CsI crystals, and can also be other types of detectors. As stated above, the electron beam 1 bombards the electron target 2 at a specific frequency so as to generate x-ray pulses at the same frequency. As to each x-ray pulse, the detector array 15 will obtain a one-dimensional image about a certain cross-section of the container. As the traction device 20 draws the container 8 to advance, a plurality of one-dimensional images obtained by a plurality of measurements generate a two-dimensional transmission image.

With respect to the neutron detection that is performed simultaneously with the x-ray imaging detection, after neutrons 6 are generated by the photoneutron conversion target 4, the container 8 to be detected is bathed within a photoneutron field. After being shot into the container 8 to be detected, the photoneutrons 6 lose energy due to scattering (inelastic and elastic scattering). It is not necessary to collimate the photoneutrons 6 before they enter the container 8 because they will disperse into a considerably wide range during scattering. The photoneutrons 6, when generated, are fast neutrons and then become slow neutrons within several μs. Thereafter, the energy of the photoneutrons 6 enters the energy region of thermal neutrons. The time interval in which the photoneutrons 6 change from fast neutrons to thermal neutrons is generally about 1 ms. The thermal neutrons will finally disappear by either being absorbed by a substance or by escaping. The time during which the thermal neutrons exist in the space is between 1 ms to 30 ms. The neutrons can also perform capture reaction in the fast neutron and slow neutron energy regions, but the cross section thereof is very small. When the energy of the neutrons decreases, the cross section will increase rapidly since the capture cross section thereof has an inverse relation to the movement speed of the neutrons. Since the electron accelerator works in a manner of continuous pulses, the thermal neutron fields of different pulses will superpose one another. For example, when the electron accelerator works at a frequency of 250 Hz and a pulse width of 5 μs, the neutron field that is finally generated in the space will be a fast neutron pulse having a frequency of 250 Hz and a pulse width of 5 μs superposed on an approximately constant thermal neutron field.

After the radiation capture reaction of the thermal neutrons with a substance, characteristic γ-rays will be emitted. For example, $^1$H can react with neutrons to emit characteristic γ-rays of 2.223 MeV; $^{14}$N can react with neutrons to emit characteristic γ-rays of 10.828 MeV; and $^{17}$Cl can react with neutrons to emit characteristic γ-rays of 6.12 MeV. The kinds of elements in the detected object can be determined through measurement of these characteristic γ-rays. Different materials within the container 8 can emit different characteristic γ-rays under irradiation of neutrons. The kinds of said materials can be analytically determined according to their different energy spectra. For example, if a large amount of signals of element N and element H are found within the container, there possibly exist explosives and a "fertilizer bomb"; and if a large amount of γ-rays of Cl are found, it is possible to find drugs such as heroin and cocaine (which are usually smuggled in the form of chloride). In addition, nuclear material (such as uranium and plutonium) can also be detected through measuring fission neutrons induced by photoneutrons.

The measurement of the energy spectrum of γ-rays is achieved by a γ-ray detecting arrangement. The γ-ray detecting arrangement can be one or more γ-ray detector arrays 14. Each γ-ray detector array 14 may include a plurality of γ-ray detectors arranged to receive the characteristic γ-rays. As shown in FIG. 1, when there is a plurality of γ-ray detector arrays 14, they can be arranged on both sides of the travelling path of the container 8. The γ-ray detector arrays 14 can be arranged at a distance away from the x-ray detector array 15, i.e., at a distance from the x-ray fan beam 7 (the first x-ray beam), so as to minimize the effect of the first x-ray beam on the γ-ray detector. As to each γ-ray detector array, a two-dimensional distribution information of a concerned element is obtained through analysis of the γ energy spectrum signal.

Many kinds of γ-ray detectors can be selected, examples of which include NaI (Tl), BGO, HPGe and LaBr$_3$.

Two kinds of detectors are employed according to the present invention, i.e., an x-ray detector and a γ-ray detector. These two kinds of detectors operate in an environment where x-rays, neutrons and γ-rays coexist. Any two kinds of rays can interfere with each other. Particularly, x-rays are very intense relative to the neutrons and the γ-rays and they possibly interfere with the energy spectrum detected by the γ-ray detectors. Therefore, example embodiments of the present invention provide for the γ-ray detector to be shielded from the x-rays and the neutron rays.

Figure 4:
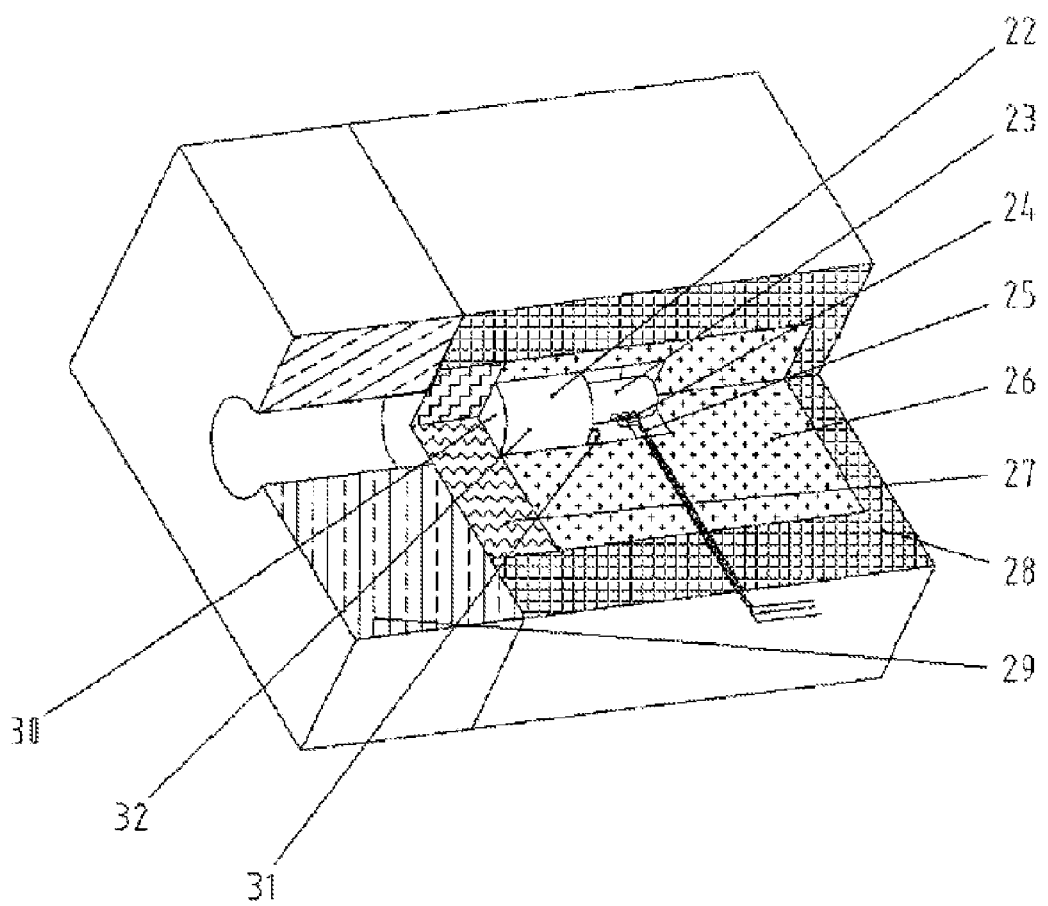
FIG. 4 shows a γ-ray detector according to an example embodiment of the present invention.

FIG. 4 shows an improved γ-ray detector, wherein a NaI crystal 22 and a photomultiplier 23 form a main part of the detector. The NaI crystal 22 has a front end face 30 for receiving γ-rays, a rear end face 31 opposite to the front end face 30, and a peripheral surface 32. When γ-rays are shot into the NaI crystal 22, a photoelectric effect, a Compton scattering, or an electron pair effect will happen. The γ photons deliver energy to secondary electrons. The secondary electrons are stopped and induce ionization within the crystal. The electron-hole generated by ionization will generate fluorescence. Fluorescence photons stimulate photoelectrons on the photocathode of the photomultiplier 23. The photoelectrons are subsequently multiplied by the photomultiplier and form voltage signal by a pre-amplifier circuit.

In order to shield the NaI crystal 22 from x-rays and neutrons, the γ-ray detector as shown in FIG. 4 further includes a neutron shield material 28 at least surrounding the peripheral surface 32 of the NaI crystal 22 and exposing the front end face 30 of the NaI crystal 22. Preferably, the neutron shield material 28 further surrounds the rear end face 31 of the NaI crystal 22. The neutron shield material 28 may be formed of a hydrogen (H)-rich substance. For example olefin, polyethylene, or water is a suitable material. Considering requirements of structure and fireproofing, polyethylene may be generally selected. H atoms in the neutron shield material 28 having greater scattering cross section to neutrons can reflect neutrons and reduce and absorb the energy of the neutrons rapidly.

However, after radiation capture between the neutron shield material 28 and the neutrons, characteristic Hγ-rays of 2.223 MeV will be emitted. The characteristic Hγ-rays will interfere with the γ signals to be measured by the detector. Therefore, within the neutron shield material 28, the γ-ray detector further includes an x/γ-ray shield body 26 at least surrounding the peripheral surface of the detector crystal and exposing the front end face 30 of the NaI crystal 22. Preferably, the x/γ-ray shield body 26 further surrounds the rear end face 31 of the NaI crystal 22. The x/γ-ray shield body 26 can not only absorb the γ-rays emitted when the neutron shield material 28 reacts with the neutrons, but also absorb the greater majority of x-rays from the electron target 2 and the scattering rays thereof so that the γ-ray detector can be in a normal operation environment. The material of the x/γ-ray shield body 26 is a heavy metal having an atomic number greater than or equal to 74, for example plumbum Pb or tungsten W.

Before the γ-ray detector crystal 22, a neutron absorber 27 is further provided facing the front end face 30 of the NaI crystal 22. Different from the requirement of the neutron shield material 28, the neutron absorber 27 is required to absorb neutrons without emitting γ-rays of 2.223 MeV of H. The neutron absorber 27 can be formed of olefin or polyethylene and a material of Boron $^{10}B$ having high and strong thermal neutron absorption capability (for example boron-containing polyethylene) so that H will not have opportunity to emit γ photons.

In order to enable the γ-ray detector to measure only the region of the detected object that is in front of the γ-ray detector and without consideration of any signals (for example x-ray scattering and the γ background count in N in the air) from other directions, the γ-ray detector further includes a collimator 29 disposed before the NaI crystal 22 and the neutron absorber 27 for shielding off x-ray scattering background in the surrounding space and the γ background generated by the neutrons in the surrounding substance. The collimator 29 includes a through hole aligned with the front end face 30 of the NaI crystal 22. The through hole defines an extension direction for allowing x/γ-rays that reach the front end face 30 substantially only in the extension direction and via the through hole to enter the NaI crystal 22 so as to collimate the γ-rays to be detected. The diameter of the through hole can be the same as that of the NaI crystal 22, and the length thereof, generally in a range of between 5 and 30 cm, can be determined according to the desired collimation effect. The collimator 29 may be made of, for example, a heavy metal (for example plumbum Pb or tungsten W) having an atomic number greater than or equal to 74 or steel.

In addition, in an example embodiment of the present invention, a time gate controlling circuit (not shown) is also provided for the γ-ray detector for controlling the measurement time of the γ-ray detector so that the measurement time of the γ-ray detector evades the beam outgoing time of the x-ray main beam generated from the x-ray generator. In this way, it is possible to further restrain the interference of the x-rays on the γ-ray detector.

Based on the signals from the x-ray detector array 15 and the γ-ray detector array 14, it is possible to perform x-ray imaging and neutron imaging of the detected container 8 so as to obtain an x-ray image and a neutron image. Returning to FIG. 1, in an example embodiment of the present invention, an x-ray imaging signal processing circuit 17 receives and processes signals from the x-ray detector array 15 to obtain an x-ray image. A γ-ray signal processing circuit 18 receives voltage signals from the γ-ray detector array 14 to analyze the γ energy spectrum so as to obtain a two-dimensional neutron image containing two-dimensional element distribution information of the detected object. The two-dimensional neutron image is merged with the two-dimensional x-ray image to realize recognition and finding of contraband within the container.

When an object is being detected, the x-ray detector array and the γ-ray detector array are disposed in different positions. As a result, the x-ray image and the neutron image cannot be obtained simultaneously when the detected object is traveling. Additionally, the neutron images obtained through the respective γ-ray detector arrays are different because the respective γ-ray detector arrays are disposed in respective different positions. In order to merge the x-ray image and the neutron image so as to realize better inspection of contraband, the following methods are employed according to examples of the present invention. As to different γ-ray detector arrays, since the distance relationships therebetween are certain, the positional relationships between the neutron images thereof are also certain. To adjust the positions of the neutron images obtained at different times can enable the γ-ray detector arrays in different positions to jointly generate a neutron image reflecting element distribution.

As to the x-ray image and the neutron image, the spatial, positional relationship thereof is also certain, and it is therefore possible to translate the neutron image and/or x-ray image and merge them into one image so that the points in the neutron image and the x-ray image that correspond to the same positions of the detected object coincide completely. In this way, as far as the merged image is concerned, each point therein contains element distribution information and density information of the detected object.

In an example embodiment of the present invention, the system may include an image merging arrangement (not shown) to realize the above-mentioned adjustment of the positions of the x-ray image and the neutron image so as to merge the x-ray image and the neutron image into one image. In this way, the operator may obtain element distribution information and density information of the detected object by observing only a single image, so as to locate the suspected contraband within the detected object relatively accurately.

Those skilled in the art can appreciate from the foregoing description that the present invention may be implemented in a variety of forms, and that the above described example embodiments are not used for limiting the scope of the present invention. Therefore, while the embodiments of the present invention have been described in connection with particular examples thereof, the true scope of the embodiments of the present invention should not be so limited since other variations and modifications which fall into the spirit and scope of the present invention will become apparent to the skilled practitioner upon a study of the drawings, specification, and following claims.

What is claimed is:

1. A photoneutron conversion target for generating photoneutrons, the photoneutron conversion target comprising:
 a body defining a passageway extending therethrough, and structured such that, upon application of an x-ray main beam to the photoneutron conversion target, a first x-ray beam of the x-ray main beam passes through the passageway without reacting with the body, while a second x-ray beam of the x-ray main beam enters and reacts with the body to emit photoneutrons.

2. The photoneutron conversion target of claim 1, wherein: the body:
   is elongated in a propagation direction of the x-ray main beam; and
   has a first end and a second end, the x-ray main beam being applied to the photoneutron conversion target, when in use, in a direction from the first end to the second end; and
the passageway extends along the propagation direction of the x-ray main beam.

3. The photoneutron conversion target of claim 2, wherein the body of the photoneutron conversion target is shaped for a propagation of the x-ray main beam that is substantially proportionate to an intensity distribution of the x-ray main beam, so that the greater an intensity of the x-ray main beam, the greater a distance of the propagation within the body of the photoneutron conversion target.

4. The photoneutron conversion target of claim 3, wherein:
   the intensity distribution of the x-ray main beam is an axially symmetrical distribution, which defines an intensity distribution symmetry axis;
   the body of the photoneutron conversion target is shaped axially symmetric about a target symmetry axis;
   the axially symmetric shape of the body substantially matches the axially symmetrical distribution of the x-ray main beam; and
   in use, the target symmetry axis coincides with the intensity distribution symmetry axis.

5. The photoneutron conversion target of claim 4, wherein the passageway extends along the target symmetry axis of the body.

6. The photoneutron conversion target of claim 3, wherein at least a portion of the body is tapered toward the second end of the elongated body.

7. The photoneutron conversion target of claim 6, wherein the tapered portion terminates at the second end.

8. The photoneutron conversion target of claim 7, wherein the tapered portion is in a shape of a cone or a truncated cone.

9. The photoneutron conversion target of claim 6, wherein the body further includes a cylindrical portion, the tapered portion being adjacent the second end, and the cylindrical portion being adjacent the first end.

10. A photoneutron-x ray source for simultaneously generating photoneutrons and x-rays comprising:
    an x-ray generator configured to generate an x-ray main beam; and
    a photoneutron conversion target configured to generate photoneutrons upon application of an x-ray main beam to the photoneutron conversion target, the photoneutron conversion target having a body that defines a passageway extending through the body and that is structured such that, upon the application of the x-ray main beam to the photoneutron conversion target, a first x-ray beam of the x-ray main beam passes through the passageway without reacting with the body, while a second x-ray beam of the x-ray main beam enters and reacts with the body to emit photoneutrons.

11. The photoneutron-x ray source of claim 10, wherein: the body:
    is elongated in a propagation direction of the x-ray main beam; and
    has a first end and a second end, the x-ray main beam being applied to the photoneutron conversion target, when in use, in a direction from the first end to the second end; and
    the passageway extends along the propagation direction of the x-ray main beam.

12. The photoneutron-x ray source of claim 11, wherein the body of the photoneutron conversion target is shaped for a propagation of the x-ray main beam that is substantially proportionate to an intensity distribution of the x-ray main beam, so that the greater an intensity of the x-ray main beam, the greater a distance of the propagation within the body of the photoneutron conversion target.

13. The photoneutron-x ray source of claim 12, wherein:
    the intensity distribution of the x-ray main beam is an axially symmetrical distribution, which defines an intensity distribution symmetry axis;
    the body of the photoneutron conversion target is shaped axially symmetric about a target symmetry axis;
    the axially symmetric shape of the body substantially matches the axially symmetrical distribution of the x-ray main beam; and
    in use, the target symmetry axis coincides with the intensity distribution symmetry axis.

14. The photoneutron-x ray source of claim 13, wherein the passageway extends along the target symmetry axis of the body.

15. The photoneutron-x ray source of claim 12, wherein at least a portion of the body is tapered toward the second end of the elongated body.

16. The photoneutron-x ray source of claim 15, wherein the tapered portion terminates at the second end.

17. The photoneutron-x ray source of claim 16, wherein the tapered portion is in a shape of a cone or a truncated cone.

18. The photoneutron-x ray source of claim 15, wherein the body further includes a cylindrical portion, the tapered portion being adjacent the second end, and the cylindrical portion being adjacent the first end.

19. The photoneutron-x ray source of claim 10, wherein the x-ray generator is configured such that the generated x-ray main beam includes x-ray pulses having a frequency.

20. The photoneutron-x ray source of claim 10, wherein the x-ray generator comprises:
    an electron accelerator for generating an electron beam; and
    an electron target at which the electron beam is directed to generate the x-ray main beam.

21. The photoneutron-x ray source of claim 20, wherein:
    the electron beam includes electron beam pulses having a frequency;
    the electron accelerator generates the electron beam pulses at the frequency; and
    the x-ray main beam includes x-ray pulses having the frequency.

22. The photoneutron-x ray source of claim 10, further comprising:
    an x-ray collimator aligned with the passageway and configured to collimate the first x-ray beam passing through the passageway into a planar fan beam.

23. The photoneutron-x ray source of claim 10, further comprising:
    a neutron reflector;
    wherein:
    the x-ray main beam is applied to the photoneutron conversion target in a propagation direction; and
    the neutron reflector is configured to reflect photoneutrons that move opposite to the propagation direction.

* * * * *

UNITED STATES PATENT AND TRADEMARK OFFICE
CERTIFICATE OF CORRECTION

PATENT NO. : 8,396,189 B2
APPLICATION NO. : 12/665296
DATED : March 12, 2013
INVENTOR(S) : Kejun Kang et al.

It is certified that error appears in the above-identified patent and that said Letters Patent is hereby corrected as shown below:

Title Page

(30) Foreign Application Priority Data: change
"Jun. 21, 2007 (CN) ............ 2007 1 0117692" to
-- Jun. 21, 2007 (CN) ............ 2007 1 0117692.8 --.

In the Specification

Column 1, line 4, add "CROSS-REFERENCES TO RELATED APPLICATION

This application is a national stage application of International Application No. PCT/CN2008/001199 filed June 19, 2008, which claims priority to Chinese Application No. 200710117692.8, filed June 21, 2007.";

Column 1, line 61, change "for the of the low" to -- for the low --.

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,396,189 B2
APPLICATION NO. : 12/665296
DATED : March 12, 2013
INVENTOR(S) : Kang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 627 days.

Signed and Sealed this
First Day of September, 2015

Michelle K. Lee
*Director of the United States Patent and Trademark Office*